US012746722B2

(12) United States Patent
Lefebvre et al.

(10) Patent No.: US 12,746,722 B2
(45) Date of Patent: Sep. 29, 2026

(54) DATA PROCESSING DEVICE FOR GENERATING MICROSTRUCTURES HAVING CONTROLLABLE DEFORMABLE PROPERTIES

(71) Applicant: INSTITUT NATIONAL DE RECHERCHE EN INFORMATIQUE ET EN AUTOMATIQUE, Le Chesnay (FR)

(72) Inventors: Sylvain Lefebvre, Le Chesnay (FR); Jonas Martinez, Le Chesnay (FR); Samuel Kenzari, Le Chesnay (FR); Jean-Claude Andre, Le Chesnay (FR); Jimmy Etienne, Le Chesnay (FR)

(73) Assignee: INSTITUT NATIONAL DE RECHERCHE EN INFORMATIQUE ET EN ATUOMATIQUE, Le Chesnay (FR)

( * ) Notice: Subject to any disclaimer, the term of this patent is extended or adjusted under 35 U.S.C. 154(b) by 360 days.

(21) Appl. No.: 18/551,606

(22) PCT Filed: Mar. 24, 2022

(86) PCT No.: PCT/FR2022/050553

§ 371 (c)(1),
(2) Date: Sep. 21, 2023

(87) PCT Pub. No.: WO2022/200742

PCT Pub. Date: Sep. 29, 2022

(65) Prior Publication Data

US 2024/0165882 A1 May 23, 2024

(30) Foreign Application Priority Data

Mar. 24, 2021 (FR) ................................. FR2102932

(51) Int. Cl.
*B29C 64/386* (2017.01)
*B33Y 50/00* (2015.01)
*B33Y 70/00* (2020.01)

(52) U.S. Cl.
CPC ............ *B29C 64/386* (2017.08); *B33Y 50/00* (2014.12); *B33Y 70/00* (2014.12)

(58) Field of Classification Search
CPC ....... A61F 2/586; B29C 64/386; B33Y 50/00; B33Y 70/00; B33Y 80/00
See application file for complete search history.

(56) References Cited

U.S. PATENT DOCUMENTS 9,506,455 B2 * 11/2016 Mazzeo .................... F03G 7/06
10,639,185 B2 * 5/2020 Agrawal ................ A61B 17/70
(Continued)

FOREIGN PATENT DOCUMENTS

FR 3049213 A1 9/2017

*Primary Examiner* — Vincent H Tran
(74) *Attorney, Agent, or Firm* — S. J. Intellectual Property Limited

(57) ABSTRACT

A device for additive manufacturing comprises a memory (52) arranged to receive shape data of the object to be manufactured and actuator data for the object to be manufactured, a computer (54) arranged to determine an additive model (56) defining an orthotropic foam using the shape data of the object to be manufactured and actuator data for the object to be manufactured.

5 Claims, 3 Drawing Sheets

(56) References Cited

U.S. PATENT DOCUMENTS

| | | | |
|---|---|---|---|
| 2015/0158244 | A1* | 6/2015 | Tibbits .................... B29C 61/04 264/479 |
| 2017/0049583 | A1 | 2/2017 | Belter et al. |
| 2017/0120535 | A1 | 5/2017 | Maccurdy et al. |
| 2019/0022875 | A1* | 1/2019 | Galloway ............ B25J 15/0475 |
| 2019/0321522 | A1 | 10/2019 | Shepherd et al. |
| 2020/0089195 | A1 | 3/2020 | Martinez et al. |
| 2020/0189124 | A1* | 6/2020 | Martinez Garrido .... B25J 9/104 |
| 2020/0316847 | A1 | 10/2020 | Tibbits et al. |

* cited by examiner

[Fig. 1]
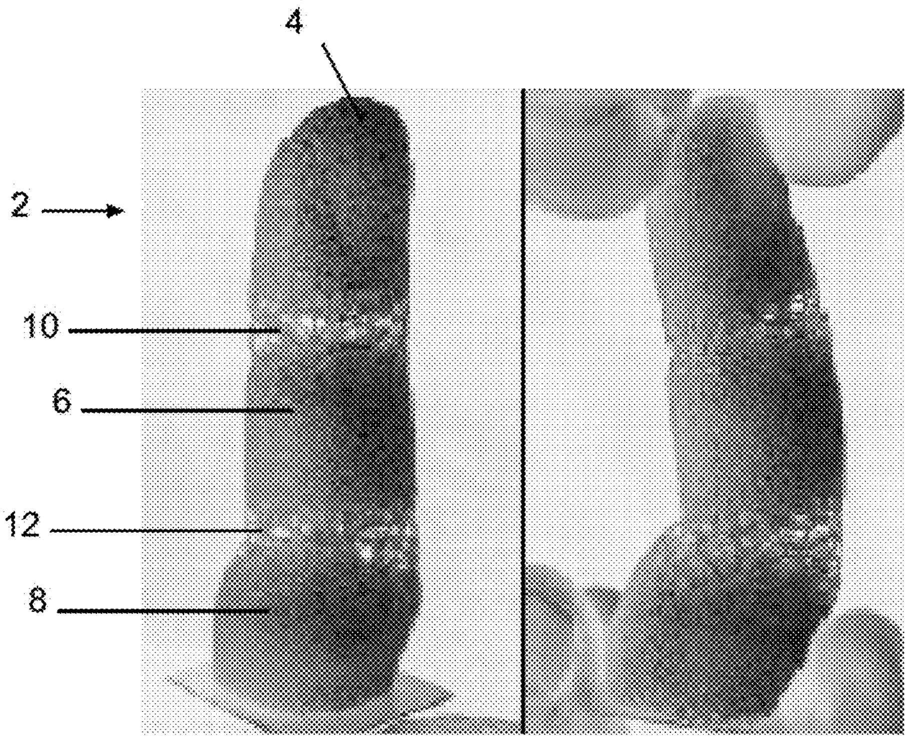
[Fig. 2]
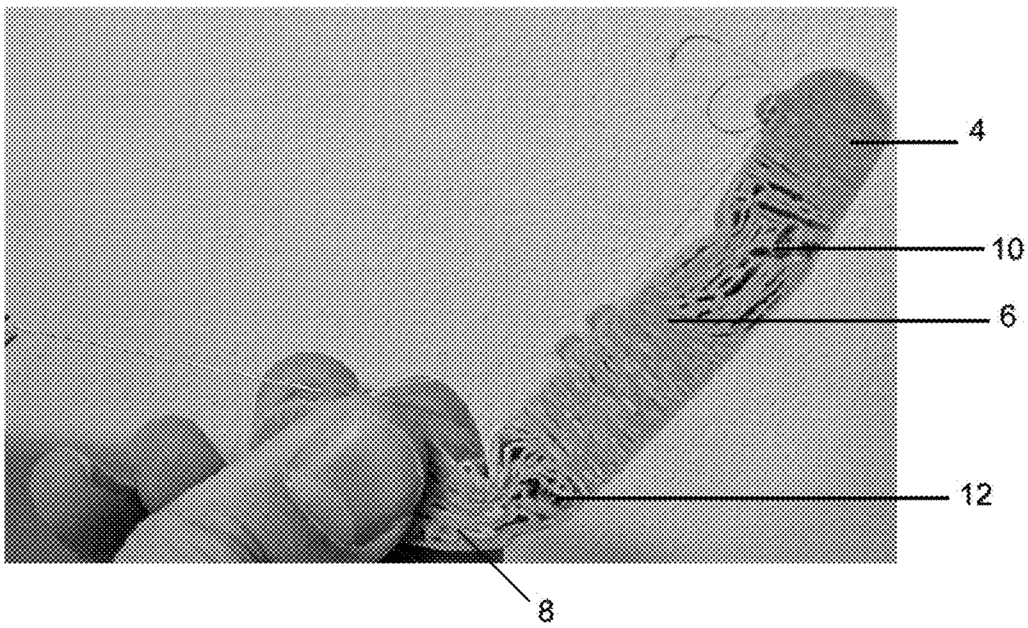

[Fig. 3]
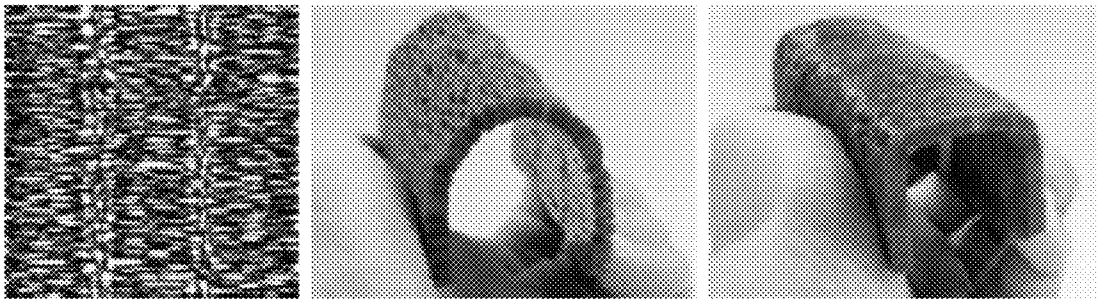
[Fig. 4]
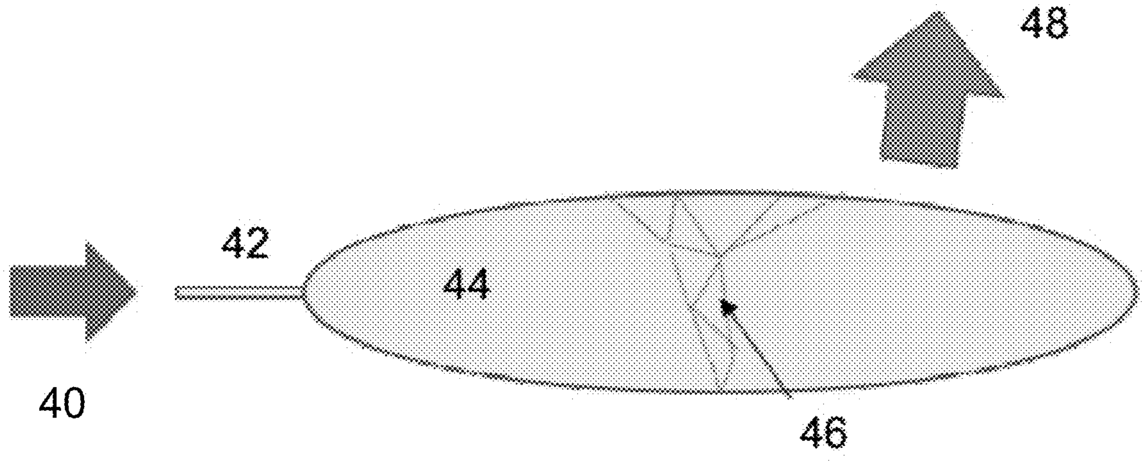

[Fig. 5]
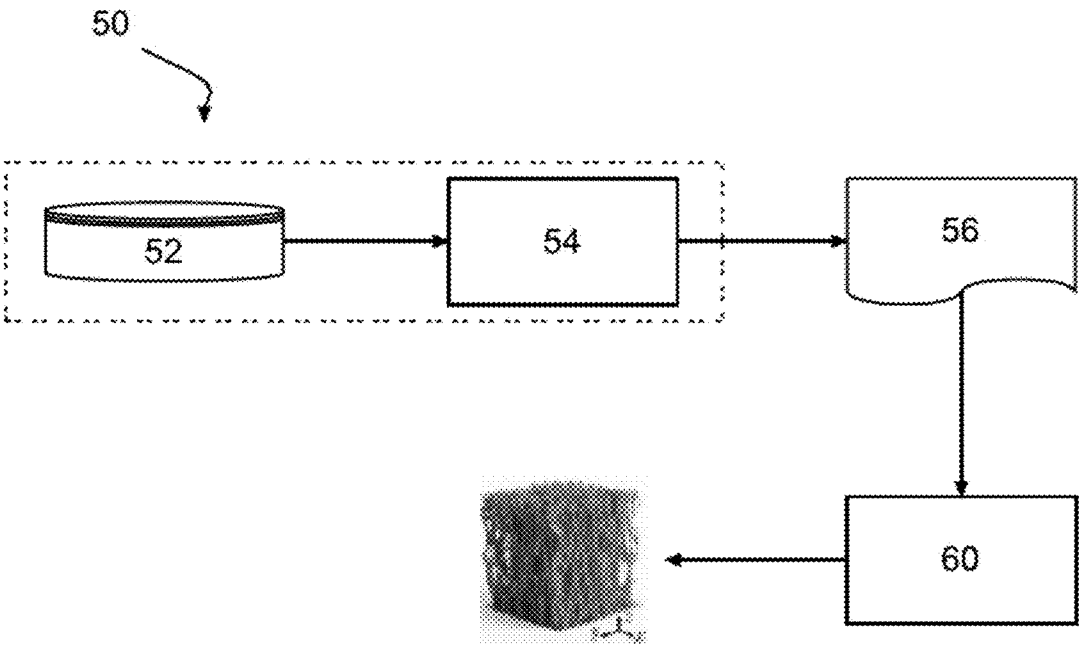

DATA PROCESSING DEVICE FOR GENERATING MICROSTRUCTURES HAVING CONTROLLABLE DEFORMABLE PROPERTIES

The invention relates to the field of additive manufacturing. More specifically, it relates to the field of additive manufacturing of structures and microstructures with deformable properties.

The work of the Applicant led it to study the embodiment of structures having selected anisotropic deformation properties and adapted deformable properties according to functional specifications in general. Thus, it filed a first French patent application under application number FR 1652497 describing foams generated thanks to Voronoi cells and having a variable elasticity depending on the selected structure.

Let us recall that a Voronoi diagram is applied to a set of points of a plane, or of a volume, referred to as sites or seeds. The diagram is a lattice including convex polygons. Each delimits the zone wherein all points are closer to the seed thereof than to any other seeds. To generate a Voronoi diagram, only some perpendicular bisectors are used and not others: sites that are too far away are not taken into consideration; then the useful segments form a so-called Delaunay triangulation or partition of the plane. In mechanics, a Delaunay triangular structure is considered to minimise the squares of the areas of the triangles. Counting the outer borders, each site is inside a convex polygon. All the points of this polygon are closer to the inner point than all the other points. This is an irregular honeycomb lattice. Using these basic principles, it is possible to define segments (in the plan) or confined surfaces (in space). Knowledge of these discrete elements is then used in additive manufacturing to create a three-dimensional object having mechanical properties according to the space and stresses exerted on the object.

Later, the Applicant filed a second French patent application under application number FR1754866 for producing orthotropic foams having deformation fields describing the directions wherein the foam is more likely to be deformed in response to stress.

Though interesting from an academic viewpoint, these inventions are difficult to use in commercial products, as the deformability thereof was difficult to start.

The invention improves the situation. For this purpose, it proposes a device for additive manufacturing, comprising a memory arranged to receive shape data of the object to be manufactured, and actuator data for the object to be manufactured, a computer arranged to determine an additive model defining an orthotropic foam using the shape data of the object to be manufactured and actuator data for the object to be manufactured.

This device is particularly advantageous as it makes it possible, by means of additive manufacturing, to create objects for which deformation is not only provided, but also controllable in the presence of advantageously mechanical stress.

According to various embodiments, the invention can have one or more of the following features:

- the actuator data define the actuators for the object to be manufactured as an additive structure, and wherein the computer is arranged to determine an additive model defining an orthotropic foam which integrates these actuators,
- at least one actuator is produced by means of one or more closed structures in the orthotropic foam, and by introducing a gas, a gel or a fluid therein,
- the actuator acts by transition ci of the gas, gel or fluid, triggered by means of a solenoid valve, a pneumatic source, or by simply pressing on one of the parts containing the gas, the gel or the fluid in fluidic contact with another part of the suitable orthotropic foam,
- the actuator data define the actuators for the object to be manufactured as non-additive elements, and wherein the computer is arranged to determine an additive model defining an orthotropic foam enabling the introduction of these actuators,
- the actuator data define the actuators so that the object to the manufactured comprises a deformable element connected to various points of the orthotropic foam, such that the deformation of the deformable element induces the deformation of the orthotropic foam according to the preferred directions of deformation of each zone comprising a point to which the deformable element is connected, and
- the computer is arranged to provide the object to be manufactured with a skin on all or part of the surface thereof.

The invention also relates to a method for determining additive model data comprising:

a) receiving shape data of an object to be manufactured,
b) receiving actuator data for the object to be manufactured,
c) determining an additive model defining an orthotropic foam from the shape data of the object to be manufactured and the actuator data for the object to be manufactured.

It also relates to a computer program product comprising portions of program code to implement the device or the method according to the invention when said program is run on a computer.

Further features and advantages of the invention will become more apparent on reading the following description, based on examples given for illustration and non-limiting purposes, based on the drawings, wherein:

FIG. 1 represents a first example of a foam having selected anisotropic deformation properties, FIG. 2 represents an example of foam according to FIG. 1 equipped with a mechanical actuator, FIG. 3 represents a second example of a foam having a deformation field, FIG. 4 represents an example of an actuator capable of being introduced into the foam of FIG. 1 or the foam of FIG. 3, and FIG. 5 represents an example of a schematic diagram of a device according to the invention.

The drawings and the description hereinafter contain, essentially, elements of a certain nature. Therefore, they may not only serve to explain the present invention better, but also contribute to the definition thereof, where applicable.

FIG. 1 represents a first example of a foam. In this example, the foam has selected anisotropic deformation properties. As can be seen in this figure, an object 2 similar to a human finger has been produced in the form of a foam having variable elastic deformation properties. Thus, the object 2 comprises a first end portion 4, a median element 6 and a second end portion 8. The first end portion 4 and the median element 6, on one hand, and the median element 6 and the second end portion 8 are interconnected respectively by a first junction portion 10 and a second junction portion 12.

In the example described here, this foam was produced according to the teachings of application FR1652497, i.e. it was generated using Voronoi cells and has a lower density in the first junction portion 10 and the second junction portion 12 in order to create preferred deformation directions when stress is applied on the first end portion 4 or on the second end portion 8. Thus, if either one is pressed, the finger bends at these portions, which then act as phalanxes.

FIG. 2 represents a foam according to the invention which benefits from the properties of the foam of FIG. 1. Indeed, a rigid thread is attached to a part of the first end portion 4, to the median element 6, and to the second end portion 8. Thus, by pulling on one end of the thread while one of the first end portion 4 and the second end portion 8 is fixed, the thread actuates the finger to bend it at the first junction portion 10 and the second junction portion 12. In the example described here, the finger was not provided with a casing acting as skin.

It can nonetheless be advantageous to provide it. Indeed, in the absence of this casing, the structure can be crushed under the tension of the thread and the deformation thereof can be more difficult to control. Alternatively, any type of solid actuator integrated in the foam or mounted thereon can be used, or be formed at the same time as the foam.

When the orthotropic foam is encased by a material of the same type or of a different type, this makes it possible to limit spatial deformations in preferred directions, enhancing them relative to a non-encased foam. Thus, the orthotropic foam is surrounded by an outer casing applying deformations in preferred spatial directions. In the absence of this "skin", the effects may be less noteworthy because it applies spatial continuity stresses not encountered in a non-encased foam, FIG. 3 represents a first example of a foam. In this example, the foam has orthotropic properties, and in particular a map of deformation fields which defines a plurality of preferred directions when one or more stresses are applied. This foam was produced according to the teachings of application FR1754866. As a general rule, the foams manufactured according to the teachings of this application are more advantageous than those embodied according to the teachings of application FR1652497, as they allow a greater breadth of preferred directions than the latter. It is thus possible to produce objects having complex kinematics.

When a material consisting of a homogeneous foam is bent, or when it consists of orthotropic foams, the deformations can be very different. This difference is used in the present invention.

In order to benefit from this structure, the invention also proposes actuators such as that represented in FIG. 4.

The example described here is based on implementing one or more closed structures in the foam, and introducing a gas, a gel or a fluid therein. The idea here is to pass one of these elements from a first part of the foam to a second part of the foam, which will be deformed along the preferred directions thereof under the effect of the pressure induced by the excess material. Transition can be triggered advantageously by means of a solenoid valve, a pneumatic source, or by simply pressing on one of the parts containing a gas, a gel or a fluid in fluidic contact with another part of the foam suitable for receiving it. For example, the pressure exerted by the weight of a person on a support placed for example in a shoe can serve as an actuator and trigger the sought deformations in terms of comfort or walking aid. In this example, the rigidities introduced into the ballonet force a deformation in preferred directions.

Thus, in the example of FIG. 4, a solenoid valve introduces a gas along a direction 40 through a pipe 42 into an orthotropic foam 44. The orthotropic foam 44 comprises a network of tubes 46 which are connected to the pipe 42, as well as a casing on the surface, such that introducing the gas will stress the foam along the direction 48.

Alternatively, the portions containing a gas, a gel or a fluid can be entirely closed, such that only they are deformed under the effect of the internal pressure variation. Nevertheless, the neighbouring portions being themselves deformable, they will be subject at least in part to stress linked with the deformation of the portion under pressure. In this case, the gas, gel or any other fluid can also be replaced by a shape memory material optionally activated as needed.

FIG. 5 represents a schematic example of implementation of a device according to the invention.

The device 50 comprises a memory 52 which receives data defining the general shape to be given to an object to be manufactured, as well as actuator data which define the type of actuator sought and their location in the object.

The device also comprises a computer 54 arranged to access the data of the memory 52 and to build an additive model 56 to produce the foam as well as the necessary elements for the existence of the actuators, i.e. the actuators themselves if they are manufactured additively with the foam, or the accesses to allow the subsequent installation thereof if required.

Finally, the device 50 controls an additive manufacturing printer 60, known per se, to produce the foam according to the additive model determined by the computer 54.

The invention claimed is:

1. Device for additive manufacturing, comprising:

a memory arranged to receive shape data of object to be manufactured and actuator data for the object to be manufactured, the actuator data defining at least one actuator configured for allowing a provided and controllable deformation of the object, a computer arranged to determine an additive model defining an orthotropic foam using the shape data of the object to be manufactured and actuator data for the object to be manufactured, wherein in the additive model the at least one actuator takes the form of one or more closed structures integrated in the orthotropic foam and configured to receive a gas, a gel or a fluid therein.

2. Device according to claim 1, wherein the actuator data configured the at least one actuator to act by transition of the gas, gel or fluid, triggered by means of a solenoid valve, a pneumatic source, or by simply pressing on one of the parts containing the gas, the gel or the fluid in fluidic contact with another part of the suitable orthotropic foam.

3. Device according to claim 1, wherein the computer is arranged to provide the object to be manufactured with a skin on all or part of the surface thereof.

4. Method for determining additive model data comprising:

a) receiving shape data of object to be manufactured, b) receiving actuator data for the object to be manufactured, the actuator data defining at least one actuator configured for allowing a provided and controllable deformation of the object, c) determining an additive model defining an orthotropic foam from the shape data of the object to be manufactured and the actuator data for the object to be manufactured, wherein in the additive model the at least one actuator takes the form of one or more closed structures integrated in the orthotropic foam and configured to receive a gas, a gel or a fluid therein.

5. Computer program product comprising portions of program code to implement the method according to claim 4 when said program is run on a computer.

* * * * *